(12) United States Patent
Yazdani et al.

(10) Patent No.: US 11,044,591 B2
(45) Date of Patent: Jun. 22, 2021

(54) CLOUD BASED PHONE SERVICES ACCESSIBLE IN THE CLOUD BY A REMOTE DEVICE

(71) Applicant: Futurewei Technologies, Inc., Plano, TX (US)

(72) Inventors: Reza Yazdani, Los Altos, CA (US); Chen Tian, Union city, CA (US); Lawrence Davison, San Jose, CA (US); Viet Trinh, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 255 days.

(21) Appl. No.: 15/406,302

(22) Filed: Jan. 13, 2017

(65) Prior Publication Data

US 2018/0206060 A1 Jul. 19, 2018

(51) Int. Cl.
*H04W 4/50* (2018.01)
*G06F 16/27* (2019.01)
(Continued)

(52) U.S. Cl.
CPC .......... *H04W 4/50* (2018.02); *G06F 9/45558* (2013.01); *G06F 16/256* (2019.01); *G06F 16/27* (2019.01);
(Continued)

(58) Field of Classification Search
CPC ......... G06F 17/30566; G06F 17/30575; G06F 2009/45562; G06F 2009/45595;
(Continued)

(56) References Cited

U.S. PATENT DOCUMENTS 9,354,928 B1 * 5/2016 Buchheit ........... H04L 29/08072
2009/0036111 A1 * 2/2009 Danford .............. H04L 41/0893
455/419

(Continued)

FOREIGN PATENT DOCUMENTS

CN 102404395 A 4/2012
CN 103259874 A 8/2013
(Continued)

OTHER PUBLICATIONS

PCT/CN2018/071645, ISR, Mar. 28, 2018.
(Continued)

*Primary Examiner* — Erica Navar
(74) *Attorney, Agent, or Firm* — Vierra Magen Marcus LLP (57) ABSTRACT

The disclosure relates to technology for establishing communication between a remote device and a virtual machine on a computing node of the cloud-based services via the distributed network. The cloud-based services include multiple operating systems and one or more applications. In response to receiving an instruction from the remote device the virtual machine is accessed, where the virtual machine is associated with at least one of a user of the remote device and the remote device. When directed by an instruction from the remote device, the virtual machine identifies one of the operating systems in which to execute the one or more applications and transmits results, based on execution of the one or more applications by the virtual machine, to the remote device via the distributed network.

21 Claims, 7 Drawing Sheets

(51) Int. Cl.
  *G06F 16/25* (2019.01)
  *G06F 9/455* (2018.01)
  *H04W 4/16* (2009.01)
  *H04L 29/08* (2006.01)

(52) U.S. Cl.
  CPC ............ H04L 67/025 (2013.01); H04L 67/10 (2013.01); H04L 67/1095 (2013.01); H04W 4/16 (2013.01); *G06F 2009/45562* (2013.01); *G06F 2009/45595* (2013.01); *H04L 67/125* (2013.01)

(58) Field of Classification Search
  CPC ... G06F 9/45558; H04L 67/025; H04L 67/10; H04L 67/1095; H04L 67/125; H04W 4/16; H04W 4/50
  See application file for complete search history.

(56) References Cited

U.S. PATENT DOCUMENTS

| | | | | |
|---|---|---|---|---|
| 2013/0311986 | A1* | 11/2013 | Arrouye | G06F 8/61 717/175 |
| 2013/0324099 | A1* | 12/2013 | Dgani | C08L 97/02 455/418 |
| 2013/0339957 | A1 | 12/2013 | Azam et al. | |
| 2014/0280436 | A1 | 9/2014 | Larkin et al. | |
| 2015/0277960 | A1* | 10/2015 | Murray | G06F 9/45533 705/26.8 |

FOREIGN PATENT DOCUMENTS

| | | |
|---|---|---|
| CN | 103430165 A | 12/2013 |
| CN | 103442024 A | 12/2013 |
| CN | 105072190 A | 11/2015 |
| CN | 105074665 A | 11/2015 |

OTHER PUBLICATIONS

Office Action dated Jan. 21, 2020, in Chinese Patent Application No. 201880006874.4, 2 pages.
Extended European Search Report dated Dec. 10, 2019, in European Patent Application No. 18739323.6, 7 pages.
Office Action dated Aug. 26, 2020 in Chinese Patent Application No. 201880006874.4.

* cited by examiner

CLOUD BASED PHONE SERVICES ACCESSIBLE IN THE CLOUD BY A REMOTE DEVICE

BACKGROUND

Cloud computing and mobile devices together form a powerful instrument for users. Cloud computing provides access to significant processing power and storage resources across vast locations, while mobile devices provide the ability to access and interact with cloud computing resources from nearly anywhere at nearly anytime.

Computers and mobile device alike execute many different software programs, including operating systems. An operating system manages the resources of a computer or mobile device so that many different processes can share the computer memory and processor. The operating system also forms a platform for other system and application software. Common operating systems now include MAC OS X, WINDOWS, UNIX and LINUX operating systems. However, a computer or mobile device is often tied to a single operating system, which resides locally on the device. Moving to a different device, hardware configuration or version of an operating system often times causes interruption in service to the local device, system reconfiguration or, in some cases, an entirely new local device. Moreover, synchronization across devices having different operating systems is difficult if not impractical.

BRIEF SUMMARY

In a first embodiment, there is a computer-implemented method for accessing cloud-based phone services over a distributed network by a remote device, comprising establishing communication between the remote device and a virtual machine on a computing node of the cloud-based services via the distributed network, the cloud-based services comprising multiple operating systems and one or more applications; and in response to receiving an instruction from the remote device, accessing the virtual machine on the computing node, the virtual machine associated with at least one of a user of the remote device and the remote device and, when directed by the instruction, identifying one of the multiple operating systems in which to execute the one or more applications in a runtime environment; and transmitting results, based on execution of the one or more applications by the virtual machine in the runtime environment of the identified operating system, to the remote device via the distributed network.

In a second embodiment according to the first embodiment, the method further comprises displaying a mirror image of the transmitted results executed by the at least one virtual instance on the remote device.

In a third embodiment, according to any one of the first to second embodiments, the method further comprises replicating the remote device on the virtual machine by providing a clone of the data stored on the remote device; and storing the clone in a database accessible by the virtual machine.

In a fourth embodiment according to any one of the first to third embodiments, the method further comprises creating a virtual phone on the virtual machine, accessible by the remote device, from a pool of applications and data libraries stored in a database and accessible over the distributed network.

In a fifth embodiment according to any one of the first to fourth embodiments, the database stores the replication for each of multiple remote devices for execution on the virtual machine.

In a sixth embodiment according to any one of the first to fifth embodiments, the remote device has a web browser to access the cloud-based services.

In a seventh embodiment according to any one of the first to sixth embodiments, the remote device is at least one of a smart phone, mobile device, automobile, personal computer, tablet and personal digital assistant.

In an eighth embodiment according to any one of the first to seventh embodiments, the method further comprises transferring updated data to the remote device in response to one or more applications in the virtual machine having a state more recent than a state of a corresponding one or more applications residing at the remote device.

In a ninth embodiment according to any one of the first to eighth embodiments, the transfer of the updated data is restricted or allowed based on accessibility permissions or privileges of the remote device.

In a tenth embodiment according to any one of the first to ninth embodiments, the remote device is a mobile phone receiving an incoming call, and the method further comprises: answering the mobile phone when at least one of the user of the mobile phone and the mobile phone is logged into the replicated version of the mobile phone residing on the virtual machine.

In an eleventh embodiment, a non-transitory computer-readable medium stores computer instructions for accessing cloud-based phone services over a distributed network by a remote device, that when executed by one or more processors, perform the steps of establishing communication between the remote device and a virtual machine on a computing node of the cloud-based services via the distributed network, the cloud-based services comprising multiple operating systems and one or more applications; and in response to receiving an instruction from the remote device, accessing the virtual machine on the computing node, the virtual machine associated with at least one of a user of the remote device and the remote device and, when directed by the instruction, identifying one of the multiple operating systems in which to execute the one or more applications in a runtime environment; and transmitting results, based on execution of the one or more applications by the virtual machine in the runtime environment of the identified operating system, to the remote device via the distributed network.

In a twelfth embodiment, there is a network device for accessing cloud-based phone services over a distributed network by a remote device, comprising a non-transitory memory storage comprising instructions; and one or more processors in communication with the memory, wherein the one or more processors execute the instructions to establish communication between the remote device and a virtual machine on a computing node of the cloud-based services via the distributed network, the cloud-based services comprising multiple operating systems and one or more applications; and in response to receiving an instruction from the remote device, access the virtual machine on the computing node, the virtual machine associated with at least one of a user of the remote device and the remote device and, when directed by the instruction, identify one of the multiple operating systems in which to execute the one or more applications in a runtime environment; and transmit results, based on execution of the one or more applications by the virtual machine in the runtime environment of the identified operating system, to the remote device via the distributed network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The disclosure relates to technology for accessing cloud-based phone services over a distributed network by a remote device. In one embodiment, a virtual phone is created by replicating a mobile phone or selecting applications from a pool of applications. The virtual phone may then be accessed by the mobile phone or other smart devices to execute applications in the cloud, such as receiving and distributing phone calls to users and remote devices.

In general, a virtual phone (or "cloud phone") is the virtualization of remote devices, such as a smart phone and other smart devices (e.g., Android phones, iPhone, MateBook, etc.). The functionality and content of remote device, for example, executing on a physical device, becomes accessible and available remotely on other remote devices. Thus, the virtual phone may be a virtual replica of an existing physical phone or a virtual phone designed in the cloud. Virtual phones may then be logged into by remote devices, and any communication (e.g., input or output) from the virtual phone conforms to the available input or output of the remote devices accessing the virtual phone.

It is understood that the present embodiments of the invention may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

Cloud-Phone-as-a-Service (cPaaS) provides the capability to access remote device data, such as mobile phone data, and operate the mobile phone from a computing device via a web browser from any network connected location. Thus, any remote device with a processor and a web browser can be converted into a mobile phone when accessing the cloud.

In one embodiment, cPaaS streams telephony services from a cloud instance as opposed to streaming telephony services to/from a physical device. In this context, cPaaS "pipes" applications through a network server to process data and returns results of the processed data to remote devices. Thus, any remote device accessing the cloud instance becomes a virtual phone with its own cloud mobile operating system. In this manner, file systems, operating systems, data and applications may be directly computed on the cloud instance. The results may then be displayed on the physical device as a mirror image of computed results.

As will be described below in more detail, cPaaS provides the functionality of smart phones on other devices that are connected to a network, such as the Internet. In this case, the system virtualizes mobile phones on the cloud such that they operate similar to a counterpart physical device with the same capabilities. In one embodiment, cPaaS provides the functionality of designing and tailoring virtual phones with all available applications without restrictions on hardware or software. That is, selected applications may run on logged in remote devices independent of the hardware and operating system they are written for or meant to run.

Figure 1:
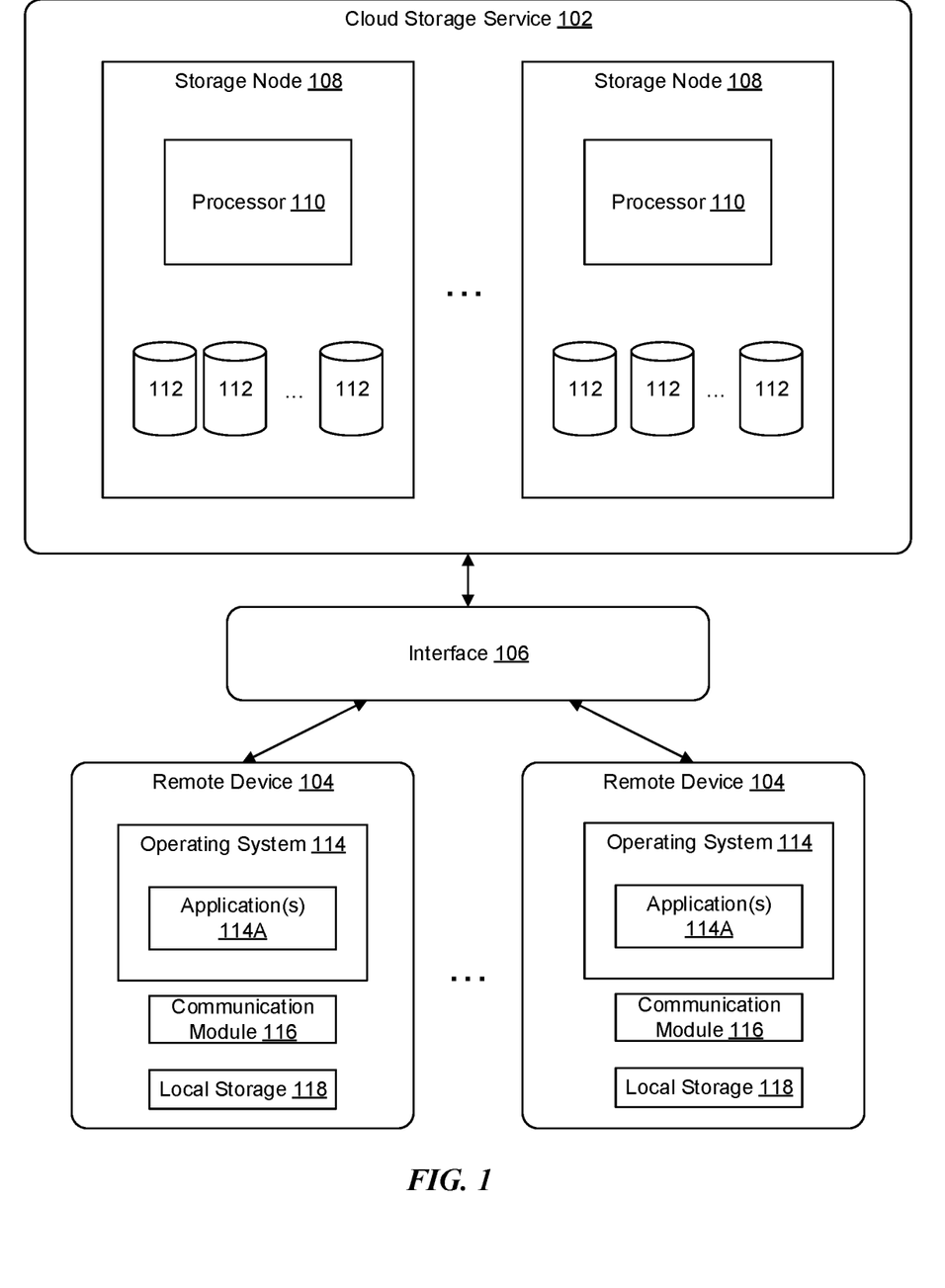
FIG. 1 illustrates an example system for mobile devices retrieving data from a cloud storage service.

FIG. 1 is illustrates an example system for mobile devices retrieving data from a cloud storage service. The system includes a cloud storage service 102, remote devices 104 and an interface 106 as implemented in a conventional system. The cloud storage service 102 is configured to store data for mobile devices. In one embodiment, the cloud storage service 102 can be a storage cluster having computer nodes interconnected with each other by a network (not shown). The storage cluster can communicate with remote devices 104 (such as a mobile device) via the Internet. The cloud storage service 102 can contain storage nodes 108. Each of the storage nodes 108 contains one or more processors 110 and storage devices 112. The storage devices can include optical disk storage, RAM, ROM, EEPROM, flash memory, phase change memory, magnetic cassettes, magnetic tapes, magnetic disk storage or any other computer storage medium which can be used to store the desired information.

The cloud communication interface 106 receives data to be stored in the cloud storage service 102. The cloud communication interface 106 can include network communication hardware and network connection logic to receive the information from the remote devices 104, and may include a queuing mechanism to organize the received synchronization data to be stored in the cloud storage service 102. The cloud communication interface 106 can also communicate with the cloud storage service 102 to send requests to the cloud storage service 102 for storing application state data and retrieving data.

The remote devices 104 include, for example, an operating system 114 to manage the hardware resources of the remote devices 104, local storage 118 to store the operating system data, application data, and user data, and a cloud communication module 116 to retrieve data from the cloud storage service 102 via the cloud communication interface 106. The remote devices 104 can be any local or remote device, such as, but not limited to, a desktop computer, a laptop computer, a tablet computer, an automobile computer, a game console, a smart phone, a personal digital assistant, a mobile hotspot device, a digital camera, a wearable smart device (such as a smart watch), or other electronic devices capable of running computer applications.

Applications 114A stored in the remote devices 104 can include applications for general productivity and information retrieval, including email, calendar, contacts, notes, weather information, etc. The applications 114A can also include applications in other categories, such as mobile games, GPS and location-based services, banking, order-tracking, ticket purchases or any other categories as often provided on mobile devices.

The remote devices 104 can download data from the cloud storage service to update or change the operating system 114 on the remote devices 104. The update or change of the operating system can be triggered by various events. For example, when the remote devices 104 detect that it has an application 114A for execution on a particular operating system 114, the remote devices 104 can request data from the cloud storage service 102 for an operating system designed for the remote device 104 to execute the particular application 114A.

Figure 2:
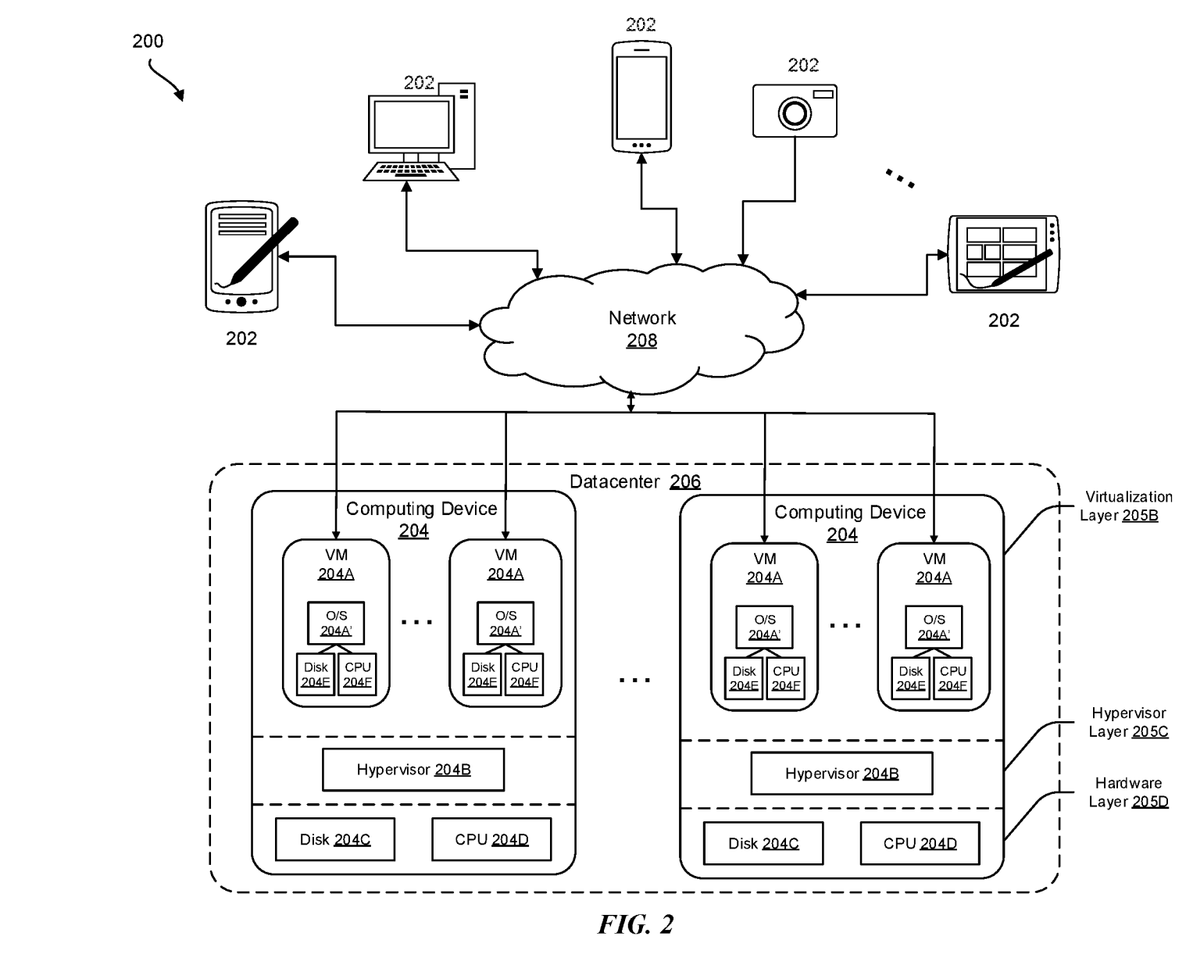
FIG. 2 illustrates an example of a cloud computing environment (or system).

FIG. 2 illustrates an example of a cloud computing environment (or system) 200. The cloud computing environment includes, for example, remote devices 202 that may communicate with computing devices 204 (such as servers) via network 208. The servers 204, in the disclosed embodiment, are part of data center 206 and include one or more virtual machines 204A. In one embodiment, the virtual machine 204A provides functionality of a physical remote device 202. The virtual machine 204A may be a system virtual machine (e.g., full virtualization), a process virtual machine (in a platform independent environment), or any other type of virtual machine as known in the art. In one embodiment, the virtual machine 204A may operate the remote devices 202 in one or more different types of operating systems.

The cloud computing environment 200 may include one or more datacenters 206, although a single datacenter is depicted in the example. A datacenter 206 may constitute geographically separated sites that host hardware for supporting cloud-based systems. As such, the datacenter 206 may include multiple blades, servers, or other computer systems for hosting virtual machines (VMs) 204A (described further below).

In one embodiment, remote devices 202 are a data server or web server. A data server may be connected to a web server through which users interact with and obtain data as requested. Alternatively, data server may act as a web server itself and be directly connected to the Internet. Data server may be connected to web server through the network 208 (e.g., the Internet), via direct or indirect connection, or via some other network. Users may interact with the data server using the remote devices 202, e.g., using a web browser to connect to the data server via one or more externally exposed web sites hosted by web server.

Remote devices 202 may be used in concert with another remote device 202 to access data. For example, from one remote device 202 a user may access another remote device 202, such as a web server, using an Internet browse, or by executing a software application that communicates with web server over the network 208, such as the Internet. Similar to the mobile devices 104 (FIG. 1), the remote devices 202 can be any local or remote device, such as, but not limited to, a desktop computer, a laptop computer, a tablet computer, an automobile computer, a game console, a smart phone, a personal digital assistant, a mobile hotspot device, or other electronic devices capable of running computer applications.

The computing devices 204 include one or more virtual machines 204A that execute on a respective server and which may replicate information from any one of the remote devices 202. The remote devices 202, which in one embodiment may be a computing device, include a virtualization layer 205B, a hypervisor layer 205C and a hardware layer 205D.

The hypervisor layer 205C includes a hypervisor 204B (or virtualization manager) that allocates and manages access to a number of physical resources in the hardware layer 205D (e.g., the processor(s), and disk(s), etc.) by at least one virtual machine 204A executing in the virtualization layer 205B.

The virtualization layer 204B is configured to create and manage virtual machines and provide other services to customers using the physical resources in the cloud. The virtualization layer 205B includes, for example, one or more operating systems 204A' and virtual resources allocated to the one or more operating systems 204A'. Virtual resources may include, but are not limited to, virtual disks 204E and virtual processors 204F, as well as virtual resources such as virtual memory and virtual network interfaces. The virtual resources and the operating system 204A' may together be referred to as the virtual machine 204A. Each virtual machine 204A may be in communication with the hypervisor 204B and used to execute applications for managing and configuring other virtual machine s 204A on the servers 204.

In one embodiment, the computing device 204 is a management server which may be configured to provide user interfaces through which cloud operators and cloud customers may interact with the cloud computing environment 200. For example, the management server 204 may provide a set of APIs and/or one or more web-based or standalone applications with user interfaces to allow cloud operators to manage the cloud resources, configure the virtualization layer, manage customer accounts, and perform other cloud administration tasks. The management server 204 also may include, a set of APIs and/or one or more web-based or standalone applications with user interfaces configured to receive cloud computing requests from end users via remote devices 202, for example, requests to create, modify, or destroy virtual machines within the cloud.

In response to client requests, the management server 204 may include a resource manager configured to select and provision physical resources in the hardware layer 205D of the cloud computing environment 200 based on the client requests. For example, the management server 204 may be configured to create and manage virtual machines 204A and their operating environments for users of remote devices 202 over a network (e.g., the Internet), providing users with the ability to provision virtual machines 204A as cloud phones that replicate a physical, remote device 202, as explained in detail below.

The network 208 may comprise any private or public network for facilitating communications between various components of the network 208. In various embodiments, the network 208 may include the Internet, a PSTN or any area network, such as a LAN, WAN, WLAN and the like. It will be apparent that, while the various components are illustrated as being directly connected to the network 208, various intermediate devices such as routers and switches (not shown) may facilitate such connections It is appreciated that FIG. 2 is an example of a network architecture that may be used, and those of skill in the art will appreciate that the specific network architecture and data processing devices used may vary, and are secondary to the functionality that they provide, as further described herein.

Figure 3:
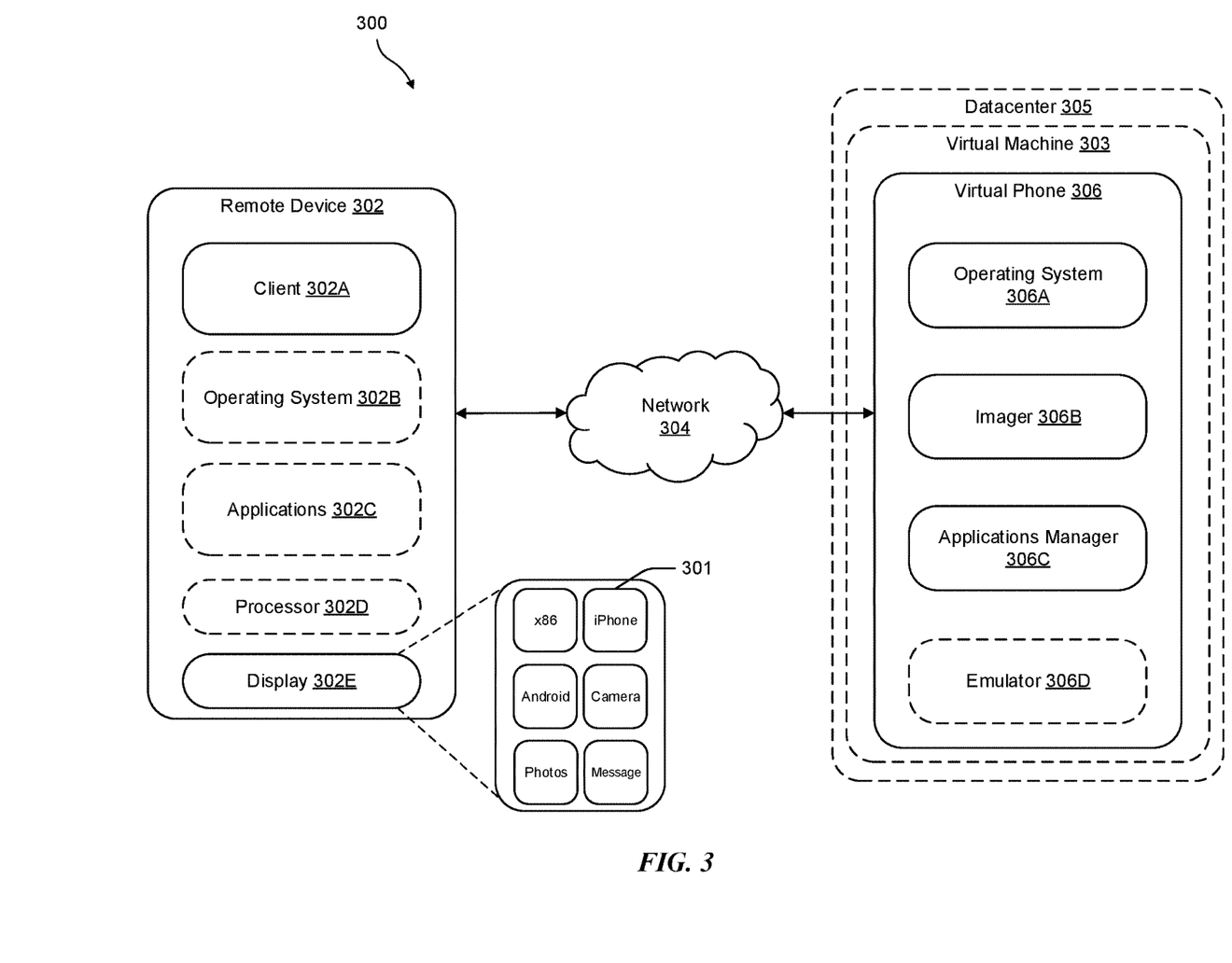
FIG. 3 illustrates an example system for providing a cloud phone over a network to a remote device in accordance with FIGS. 1 and 2.

FIG. 3 illustrates an example system for providing a cloud phone over a network to a remote device in accordance with FIGS. 1 and 2. The system 300 includes, but is not limited to, a remote device 302, virtual phone 306 (which may be part of or independent from datacenter 305) and network 304. Only a single remote device 302, datacenter 305, virtual machine 303 and virtual phone 306 are depicted in the disclosed embodiment. However, it is appreciated that any number of these devices and components may be employed in the system 300.

The remote device 302 includes, for example, a client 302A, an operating system 302B, application(s) 302C, a processor 302D and display 302E. In one embodiment, the remote device 302 is a processing device, such as a computer, mobile device, laptop, cell phone, smartphone, tablet, wearable smart device, digital camera or media player. Dashed lines represent optional components.

The client 302A may be, for example, a program installed on the remote device to enable a user of the remote device to remotely interact with and control various application(s) 302C installed in the cloud. In general, the client 302A responsible for communicating and processing information from the operating server 306A and image server 306B of the virtual pone 306 via network 304.

In one embodiment, the client 302A may be configured to obtain information from the remote device 302 such as, but not limited to, information about the device hardware or firmware, hardware configuration, software or operating system(s) and applications. Other information that may be retrieved includes, but is not limited to, whether an operating system is currently operating on the remote device 302, what operating system or application(s) are cached on the remote device 302, user preferences, usage type, operating system or functionality desired by the user of the remote device 302, etc.

In another embodiment, the client 302A is an image builder that is responsible for creating and registering virtual phones 306 in the datacenter 305. Created and registered phones may be, for example, customized as designed by the user and/or based on the configuration of the remote device 302 (i.e., the configuration of the existing physical remote device is replicated or cloned). In the case of customization, a remote device image may be created in the virtual machine 303 by selection of a number of preconfigured image templates or a pool of applications (e.g., iPhone, Android, x86, etc.), music libraries and video libraries or physical devices, such as a camera.

Operating system 302B may optionally reside on the remote device 302 and/or be stored as part of the operating system server 306A in the virtual phone 306. As appreciated, the operating system 302B manages computer hardware and software resources and provides common services for computer programs. Operating systems may include, but are not limited to, Microsoft Windows, OS X, Linux, Android and iOS, including mobile, server and desktop versions.

In one embodiment, the operating system 302B may run on both the virtual phone 306 and the remote device 302. In another embodiment, the operating system 302B may run on one of the virtual phone 306 and the remote device 302.

Application(s) 302C may also optionally reside on the remote device 302 and/or be stored as part of the virtual phone 306. Application(s) 302C may be a computer program designed to perform a group of coordinated functions, tasks or activities in a selected operating system. For example, applications may include word processors, a web browser, a media player, games, etc. In one embodiment, application(s) 302C may be mobile applications (or apps) that are designed to run on mobile devices, such as smartphones and tablets. Mobile applications may include, for example, a web browser, email client, calendar, mapping program, etc.

In one embodiment, the application(s) 302C may run on both the virtual phone 306 and the remote device 302. In another embodiment, the application(s) 302C may run on one of the virtual phone 306 and the remote device 302.

Processor 302D may be any processor, central processing unit, microprocessor, multi-core processor, graphics processing unit (GPU), accelerated processing unit (APU), front-end processor and any type of processor known in the art. While some form of processing power is disclosed on the remote device 302, it is appreciated that the virtual phone 306 may offload intensive workload from the physical device (remote device 302) to speed up the computation, data access and network operations.

Display 302E may be any display, such as color super twisted nematic (CSTN) display, a thin film transistor (TFT) display, a thin film diode (TFD) display, an organic light-emitting diode (OLED) display, an active-matrix organic light emitting (AMOLED) diode or Super AMOLED display, a capacitive touchscreen, a resistive touchscreen, retina display, haptic/tactile touchscreen or any other well-known type of display.

In one embodiment, the display 302E displays icons 301 representing software or hardware residing on the remote device 302. In another embodiment, the display 302E displays icons 301 representing software or hardware residing on the virtual phone 306. In still another embodiment, the icons 301 may represented a combination of the remote device 302 and the virtual phone 306 software and hardware. In the depicted example, the icons 301 correspond to various platforms, such as x86, iPhone (iOS), Android, as well as applications and hardware, such as a camera, photos and message. It is appreciated that the illustrated embodiment is non-limiting, and that any number of icons may be displayed, as readily appreciated by the skilled artisan.

In one embodiment, the icons 301 (corresponding to hardware or software) may be arranged in any customized manner so as to represent the layout and customization of the remote device 302, virtual phone 306 or any combination thereof.

In one embodiment, datacenter 305 and virtual machine may be the datacenter 206 and virtual machine 204A described with reference to FIG. 2 or the cloud storage service 102 described with reference to FIG. 1. As depicted, the datacenter 305 comprises a virtual machine 303 and a virtual phone 306, which may reside for example on a virtual machine of a computing device. Although depicted as a single virtual phone 306, it is appreciate that any number of virtual phones 306 may reside within the virtual machine 303 of datacenter 305. It is also appreciated that the virtual phone 306 may also be another remote device, such as a mobile or smart device, that operates as the virtual phone 306 in accordance with the disclosures herein. For example, the datacenter 305 may comprise one or more remote devices that operate as the virtual phone in manner similar to the virtual machine 303.

The virtual phone 306 includes, but it not limited to, operating system 306A, imager 306B, application(s) manager 306C and emulator 306D. Operating system 306A may store an operating system for managing the various hardware resources and providing common services to other instruction sets executed by a processor, such as CPU 110. In some embodiments, the operating system 306A supports virtual machines, such as virtual machine 204A, and may include a hypervisor 204B for managing the virtual machines 204A. In another embodiment, the virtual phone 306 may be an actual, physical remote device, for example a mobile or smart phone, such as iPhone or Android phone having an operating system 306A that may be iOS, Android, etc. at the same time or individually.

In other embodiments, the operating system 306A may store or receive from a base image. A base image can include, among other things, a kernel or a full version of an operating system. In another embodiment, the base image can include a larger or different version of an operating system. In yet another embodiment, the base image or full image may be cached on a local or remote device.

Imager 306B, such as an image file server, stores image files in a virtual machine storage. More specifically, the imager 306B controls virtual machine image files available for use by the virtual phone 306. The imager 306B may be connected to remote devices 302 via network 304, such as a local area network or a wide area network, such as the Internet. As appreciated, the imager 306B may operate on a single computing device or may be executed across multiple distributed computing devices, such as computing devices 204. In one embodiment, the imager 306B communicates with the remote devices 302 using a standard high-level network protocol, for example HTTP, SMB or FTP.

Imager 306B may be connected to a virtual repository or storage (not shown), which stores image files available for use by the remote devices 302. However, it is appreciated that the files can be stored using any system, method, or technique known in the art for data storage. Moreover, the virtual repository or storage may operate at a single computing device 204 or may be distributed across multiple computing or storage devices.

Application(s) manager 306C is responsible for monitoring the physical remote device 302 (for example, through the client 302A) for application installations or removals from the remote device 3002 so that the same behavior can be replicated in the virtual instance of the virtual phone 306. In another embodiment, the application manager 306C is responsible for installation or removals of the templates or pool of applications selected during the creation of the virtual phone 306. The application manager 306C may also be responsible for processing of applications on the virtual phone 306C, whether replicating the applications from the remote device or otherwise selected as part of the creation and customization of the virtual phone 306.

In the case of applications residing on the remote device 302, installation information of the application(s) 302C is pushed to the application(s) manager 306C via client 3002A via network 304. In another embodiment, the applications reside on the virtual phone 306 when the virtual phone 306 is created. In either case, the application(s) may be maintained, for example, in an application repository or storage (not shown) of the application manager 306C and used to create the virtual instance of the remote device 302. It is also appreciated that the application repository or storage may be independent of the applications manager 306C.

In another embodiment, the applications manager 306C may include virtual machines capable of managing an application deployed within the datacenter 305. The applications manager 306C may perform various functions such as requesting resources for allocation or deallocation from the cloud computing environment 200, loading application virtual machines on the infrastructure, or monitoring application performance on the application virtual machines.

In one embodiment, optional emulator 306D emulates the software components of a physical instance of a remote device 302 in a corresponding virtual instance of the remote device 302. The emulator 306D may include a software and hardware emulation layer (not shown).

For example, to emulate a specific piece of application software, the virtual phone 306 causes the hardware emulation layer to be loaded and executed, followed by a copy of the application software from the software emulation layer to be executed on top of the hardware emulation layer, to imitate the software being executed on the physical instance of the remote device 302 and interacting with the actual hardware components.

In another embodiment, the software is not being executed on the physical instance of the remote device 302, but merely replicated and executed on the virtual instance of the virtual phone 306 corresponding to the physical instance on the remote device 302.

Figure 4:
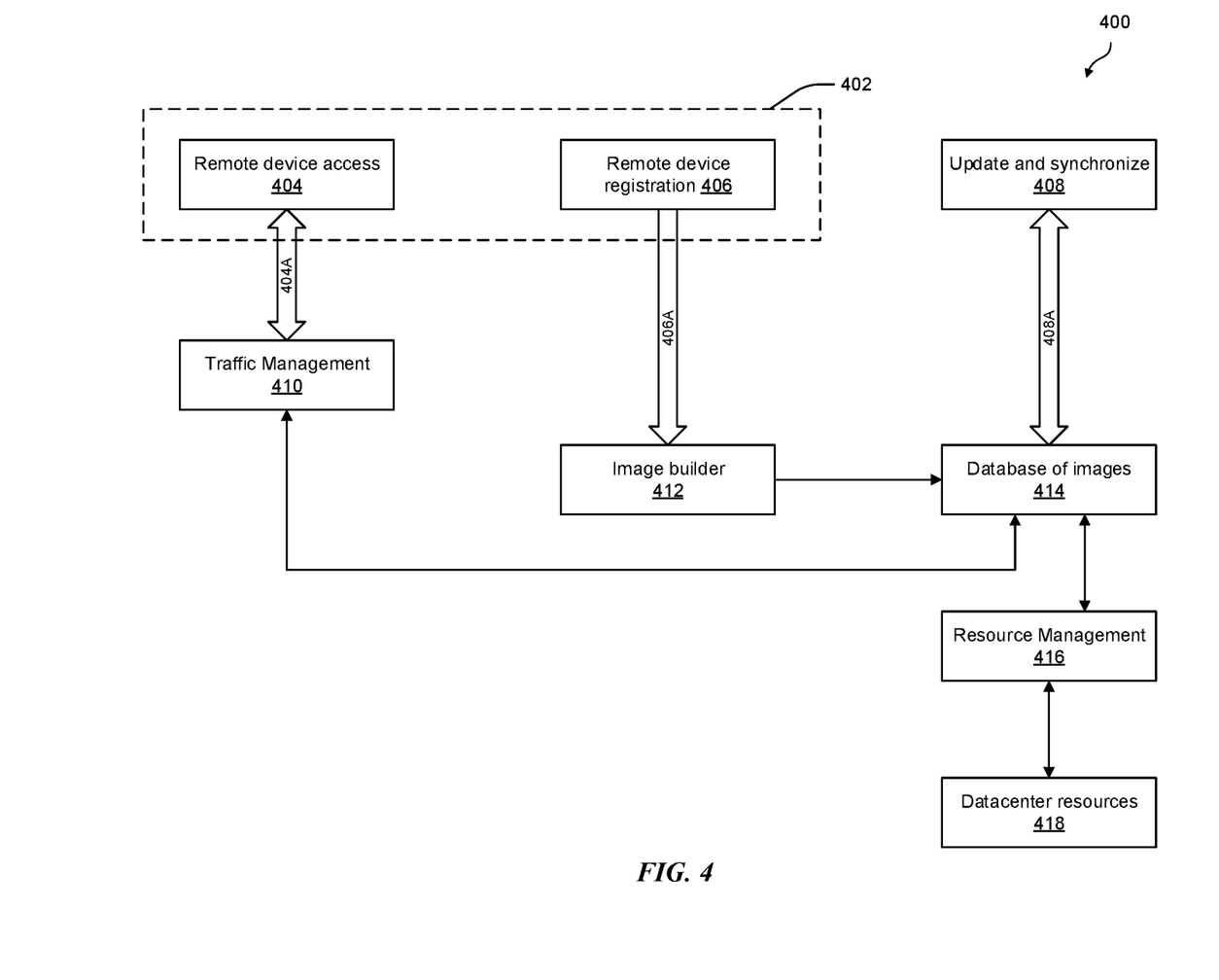
FIG. 4 illustrates an example data flow of accessing, registering and updating a remote device in accordance with FIG. 3.

FIG. 4 illustrates an example data flow of accessing, registering and updating a remote device in accordance with FIG. 3. As illustrated, remote device access at 404 and remote device registration at 406 are user based events and operations that are performed at the user end side 402, such as at the remote device 302, of the system 400. Updates and synchronization at 408 are executed on the cloud end side, such as datacenter 305, of the system 400. Accordingly, the embodiments disclosed herein are executable in the systems, devices and components depicted in FIGS. 1-3.

Registration of a remote device at 406 may be executed by the remote device 302 contacting and sending a request 406A to a registration service, such as an image builder, at 412. The image builder is responsible for creating and registering virtual phones 306, among other features. In one embodiment, the request 406A is a request to replicate or clone the physical remote device 302. The request 406A may also additional information, such as the identity of the connected network, the identity of the remote device 302 and/or the identity of the subscriber of the remote device 302. The remote device 302 image files are copied by the image builder 412 and stored in a database of images or repository of registered virtual phones 306 at 414.

In another embodiment, the request 406A is a request to create or design a virtual phone 306. As described above, the creation of a customized virtual phone 306 may include selection of various templates or applications from a pool of applications. These templates and applications may include libraries, applications or data that are currently available on the physical remote device 302 and/or selected from the database of images 414 that is accessible by the image builder 412. In one other embodiment, the image builder may need to determine the type of operating system that the remote device (or virtual instance thereof) should run based on various factors, such as the type of applications selected for execution on the virtual phone 306. Additionally, in another embodiment, more than one operating system may be employed on the virtual phone 306 to thereby allow applications requiring a variety of different operating systems.

Accessing a remote device 302 registered with the system 400 may be accomplished at 404. The remote device 302, as described above, may be any local or remote device, such as, but not limited to, a desktop computer, a laptop computer, a tablet computer, an automobile computer, a game console, a smart phone, a personal digital assistant, a mobile hotspot device, or other electronic devices capable of running computer applications.

When a remote device 302 requests access to a virtual phone 306, traffic between the remote device 302 and the virtual phone 306 may be managed by a traffic manager (not shown), such as a traffic management server, at 410. The traffic manager may include virtually any network device capable of managing network traffic between the remote device 302 and virtual phone 306.

The traffic manager may perform the operations of routing, translating, switching packets, or the like. In one embodiment, the traffic manager may perform load balancing operations to determine a server device to direct a request. Such load balancing operations may be based on network traffic, network topology, capacity of a server, content requested, or a host of other traffic distribution mechanisms.

In one embodiment, the traffic manager is responsible for managing images stored in the database of images as various virtual phones 306 are updated and synchronized.

It is appreciated that the traffic manager may be part of the virtual machine hosting the virtual phone 306, part of the computing device 204 hosting the virtual machine and/or part of the datacenter 206 in which the computing device resides, or communicatively located outside of the datacenter.

Updating and synchronization of the remote device 302 and the virtual phones 306 is coordinated at 408, where updates and synchronizing utilize database images as a means to transfer data 408A. In one embodiment, data may be updated in the remote device 302 without the knowledge of the virtual phone 306. For example, the remote device acquires images while not connected to any network. Similarly, the virtual phone 306 may acquire information that the remote device 302 is not otherwise aware of.

For example, if the virtual phone is accessed by a first remote device 302, such as a personal computer, and later accessed by a second remote device 302, such as a mobile phone, the mobile phone may not have knowledge of transactions between the personal computer and the virtual phone 306. To prevent such as occurrence, when updates are made at either the remote device 302 or the virtual phone 306, data between the remote device 302 and the virtual phone 306 may be synchronized to reflect the updates.

In one embodiment, the updates and synchronization follow a particular user, while in another embodiment, the updates and synchronization apply to a group of remote devices 302 and/or virtual phones 306.

Resource management, such as a resource management server, decides where to execute commands (e.g., hardware, operating system, emulator, etc.) and delivers results to corresponding destinations at 416. In this context, the resource management server also has access to the database of images that represent each of the registered virtual phones 306.

Figure 5A:
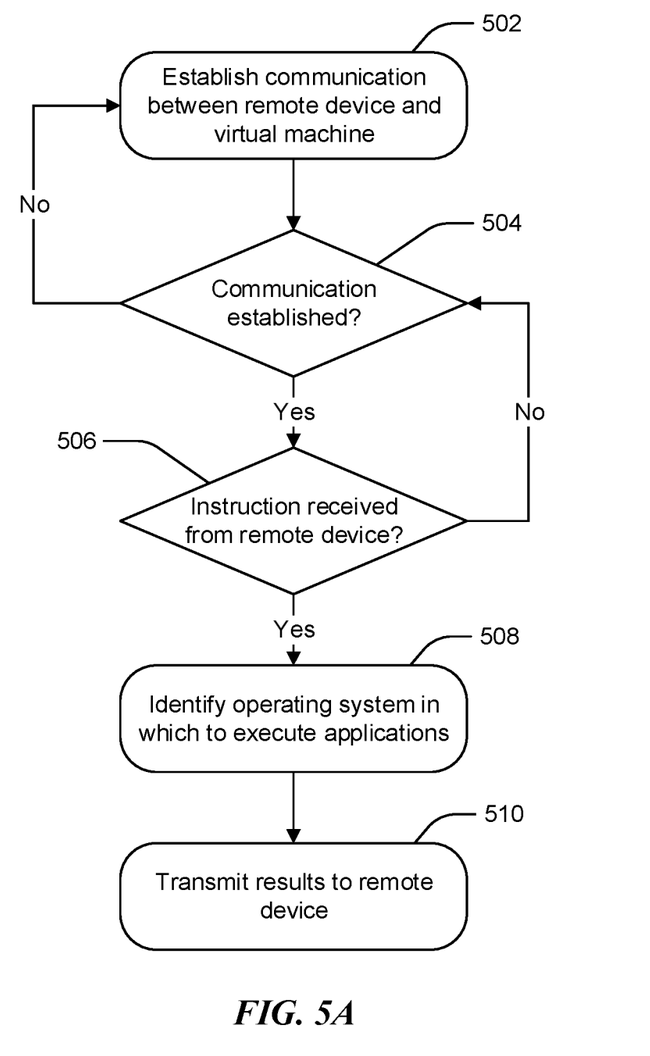
FIGS. 5A-5C are flow diagrams of the methodology implemented on the systems of FIGS. 1-3.
Figure 5B:
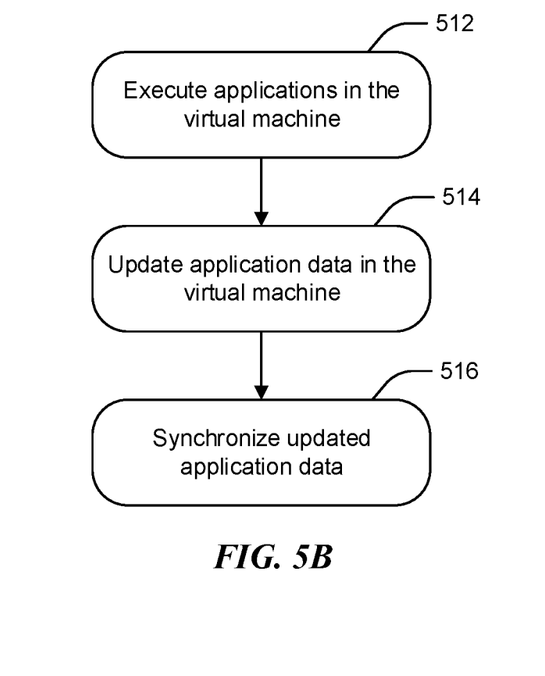
Figure 5C:
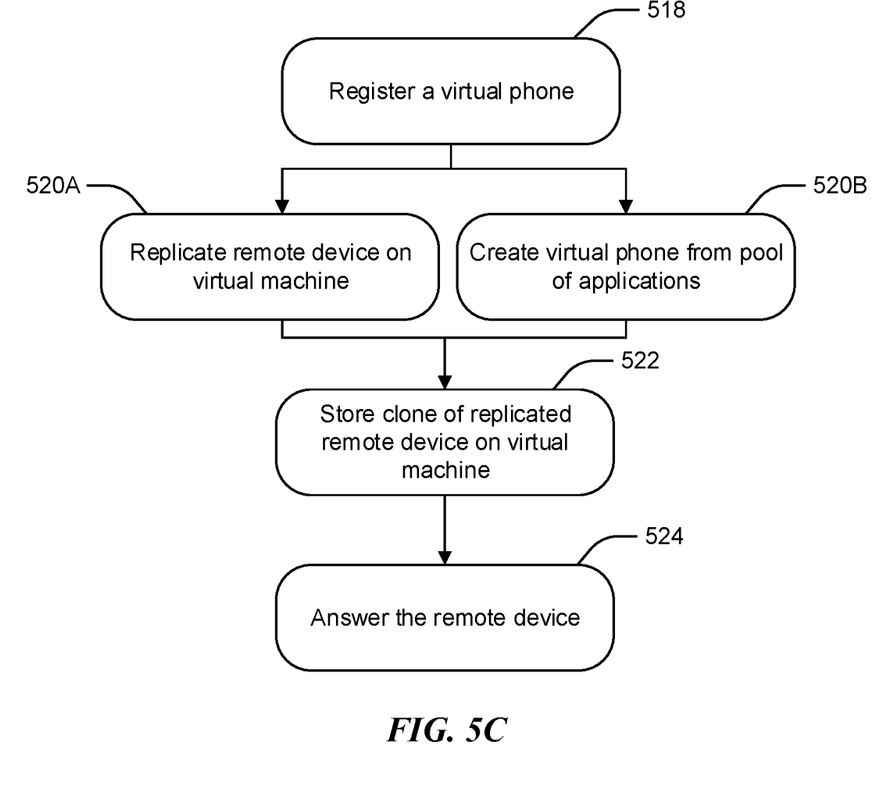

FIGS. 5A-5C are flow diagrams of the methodology implemented on the systems of FIGS. 1-3. In the discussion that follows, the methodology is performed by a virtual machine 204A residing on a computing device 204 of the datacenter 206. However, it is appreciated that performance is not limited to such an embodiment and that any processing device, component or software capable of such execution may implement the methodology.

With reference to FIG. 5A, the remote device 302 attempts to establish communication with a virtual machine 204A (for example, operating as a virtual phone 306) on a computing node 204 of the cloud-based services via the distributed network 208 at 502. Communication may be established between one or more remote devices 302 (at the same or different times) registered with the virtual phone 306 and consistent with the description above. In order to establish communication, a remote device 302 should be registered and logged into the virtual phone 306. In one embodiment, registration includes a subscription to virtual phone services. In another embodiment, users may detail a list of phone numbers to be associated with the subscription or registration process.

At 504, the virtual machine 204A determines whether communication has been established with a remote device 302. Communications may include, but are not limited to, phone calls, text messages, media messages (such as video and pictures), emails, exchange of information or data, and any other communication between the remote device 302 and virtual machine 306. If no communication has been established, then the process returns to 502. Otherwise, if the virtual machine 204A determines that a communication with a remote device 302 has been established, the virtual machine 204A waits for an instruction by the remote device 302.

For example, if a phone call is received at the remote device 302, a user will answer the remote device 302 by selection of an "answer" icon. In response to selection of the icon on the remote device 302, an instruction will be sent to the virtual phone 306.

In response to receiving an instruction from the remote device 302, the virtual machine 204A is accessed at the computing node 204. In one embodiment, the virtual machine 204A is associated with at least one of a user of the remote device 302 and the remote device 302 itself. Initially, the virtual machine 204A identifies an operating system, among one or more operating systems (e.g., iOS, Android, OS X, Windows, Linux, etc.) in which to execute application(s). If no instruction is received, the process returns to 504 and waits for a communication from the remote device 302.

At 510, results from the virtual machine 204A are transmitted to the remote device 302 based on execution of the one or more applications by the virtual machine in the runtime environment of the identified operating system. In one embodiment, the results may then be displayed at the remote device 302 as an image of the results transferred by the virtual machine 204A via the distributed network 208.

In FIG. 5B, one or more applications are executed in the virtual machine 204A, as described above. Once an update occurs at either the remote device 302 or the virtual machine 204A at 514, the updates are synchronized at 516. In one embodiment, data may be updated in the remote device 302 without the knowledge of the virtual phone 306. For example, the remote device acquires images while not connected to any network. Similarly, the virtual phone 306 may acquire information that the remote device 302 is not otherwise aware of. In yet another embodiment, the remote device 302 and the virtual phone 306 may operate on the same set of files in parallel such that the programs on the remote device 302 and virtual phone 306 need to collaborate to keep the applications and user data consistent with each other.

Turning to FIG. 5C, a virtual phone 306 is registered in the network at 518. Registration of the virtual phone 306, as described above, may be accomplished by creating an account for a user and/or a remote device (or group of users and/or remote devices) and selectively replicating the remote device 302 on the virtual machine 204A at 520A or creating a virtual phone 204A by selection of virtual phone templates and/or from a pool of applications at 520B, as described above.

In one embodiment, replication of a remote device 302 includes migrating or cloning application(s), including the state of the application and associated data files, from the remote device 302 on the virtual machine 204A. In another embodiment, the remove device 302 operating environment is cloned or uses a standard image of the remote device 302 to create the virtual phone 306. Users may also alter the operating environment to add or remove applications when creating or subsequently modifying the virtual phone 306.

At 522, the replicated or cloned remote device 302, including modifications or updates, is stored at the virtual machine 204A.

Upon completion of registering the virtual phone 306, a remote device 302 may respond to inquiries received at the virtual phone 306, such as answering a telephone call, at 524. In one embodiment, a first remote device 302 (e.g., an Android Phone) logs into a second remote device (e.g., an iPhone). In one instance, upon logging into the second remote device 302, wallpaper of the second remote device 302 appears on the first remote device 302. Thus, the first remote device 302 operates on the second remote device 302 remotely after the login.

In one embodiment, inputs may be provided by the first remote device 302, processed on the virtual phone 306 and results sent back to the first remote device 302. Outputs may be provided by the virtual phone 306 or the second remote device 302. For example, a phone call to the second remote device 302 may be answered by the first or second remote device 302. A photo taken by the first remote device 302 is stored on the virtual phone 306 and sent to the second remote device 302. A photo taken by the second remote device 302 is moved to the virtual phone 306 and may be visible by the first remote device 302. In one embodiment, permissions or privileges may restrict access to some or all of the second remote device 302 data to make the data available or unavailable according to the permissions or privileges.

Figure 6:
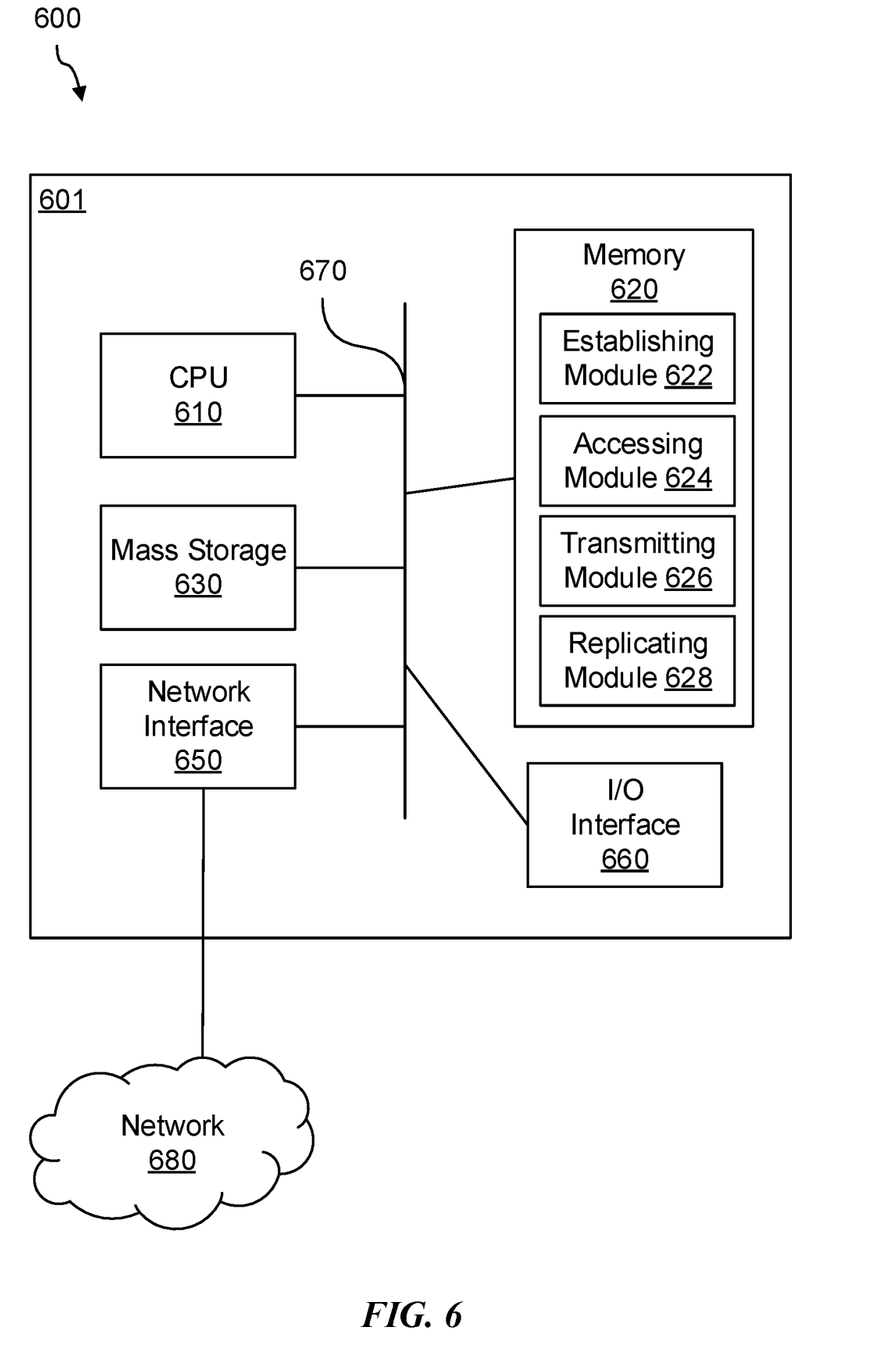
FIG. 6 illustrates a block diagram of a network system that can be used to implement various embodiments.

In one example, a remote device 302 using the cloud computing environment 200 has an application running on it to facilitate communication with the virtual phone 306. In the following example, let us assume a first remote device 302 calls a second remote device 302, where the first and second remote devices 302 are subscribers to the cloud computing environment 200. In this example, calls made from the first remote device 302 follow the following procedure: 1) a phone number of the second remote device 302 is dialed by the first remote device 302, 2) the first remote device 302 dials (connects to) the virtual phone 306 and sends along the second remote device 302 phone number, 3) the virtual phone 306 receives the call and brings up the virtual phone 306 corresponding to the second remote device 302. The virtual phone 306 passes the call from the first remote device 302 to all devices currently logged into the virtual phone 306, including the second remote device 302, 4) one or more devices currently logged in to the virtual phone 306 may answer the call, 5) if none of the devices associated with the virtual phone 306 answer the call, it goes to a voicemail. In one embodiment, if a text message is sent from the first remote device to the second remote device, the text is recorded and reported when a connection is established, and 6) the physical phone is updated with the call and the text message in the conventional manner. FIG. 6 is a block diagram of a network device 600 that can be used to implement various embodiments. Specific network devices may utilize all of the components shown, or only a subset of the components, and levels of integration may vary from device to device. Furthermore, the network device 600 may contain multiple instances of a component, such as multiple processing units, processors, memories, transmitters, receivers, etc. The network device 600 may comprise a processing unit 601 equipped with one or more input/output devices, such as network interfaces, storage interfaces, and the like. The processing unit 601 may include a central processing unit (CPU) 610, a memory 620, a mass storage device 630, and an I/O interface 660 connected to a bus 670. The bus 670 may be one or more of any type of several bus architectures including a memory bus or memory controller, a peripheral bus or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. In one embodiment, the memory 620 includes an establishing module 622 to establish communication between the remote device 302 and the virtual machine 204A, an accessing module 624 to access the virtual machine 204A and identify an operating system, a transmitting module 626 to transmit results and updates to the remote device 302 and a replicating module 628 to replicate the remote device 302 on the virtual machine 204A.

The mass storage device 630 may comprise any type of storage device configured to store data, programs, and other information and to make the data, programs, and other information accessible via the bus 670. The mass storage device 630 may comprise, for example, one or more of a solid state drive, hard disk drive, a magnetic disk drive, an optical disk drive, or the like.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

In some embodiments, data on a virtual phone is available to remote devices, the virtual phone operates independently of the operating system, media may be accessed without a physical mobile phone being present, and a physical device may be transformed into another type of physical device by accessing the virtual phone. Additionally, a virtual mobile device (phone) may be built on the cloud from available software and does not require corresponding hardware (e.g., a mobile phone is not required), information may be accessed by any device connected to the Internet and data is stored in the cloud.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for accessing cloud-based services over a distributed network by a remote device, comprising:

establishing communication between one or more remote devices and a virtual machine on a computing node of the cloud-based services via the distributed network, the cloud-based services comprising multiple operating systems and one or more applications, and the one or more remote devices being associated with a user;

accessing the virtual machine on the computing node in response to receiving an instruction from a first remote device of the one or more remote devices, the virtual machine being associated with each remote device of the one or more remote devices;

identifying a first operating system of the multiple operating systems in which to execute the one or more applications in a runtime environment when directed by the instruction, the identifying based on a first remote device operating system associated with the first remote device;

transmitting results, based on execution of the one or more applications by the virtual machine in the runtime environment of the identified operating system, to the each remote device of the one or more remote devices via the distributed network;

updating the one or more remote devices with the results transmitted by the virtual machine, the updating performed to synchronize data across the one or more remote devices such that the user can access the synchronized data at the each remote device of the one or more remote devices; and creating a virtual phone on the virtual machine by replicating one device of the one or more remote devices, the virtual phone receiving an incoming telephone call on the virtual machine, the virtual phone being accessible by at least one of the other one or more remote devices; and answering the incoming telephone call at a second remote device of the one or more remote devices when the user or the one or more devices is logged into the replicated version residing on the virtual machine.

2. The method of claim 1, further comprising displaying a mirror image of the transmitted results executed by at least one virtual instance on the one or more remote devices.

3. The method of claim 1, further comprising replicating the one or more remote devices on the virtual machine to generate a replicated version, the replicating providing a cloned data of data stored on the one or more remote devices; and storing the cloned data in a database accessible by the virtual machine.

4. The method of claim 1, wherein the virtual phone is created from a pool of applications and data libraries stored in a database and accessible over the distributed network.

5. The method of claim 4, wherein the database stores a replication for the each remote device of the one or more remote devices for execution on the virtual machine.

6. The method of claim 1, wherein the one or more remote devices have a web browser to access the cloud-based services.

7. The method of claim 1, wherein the one or more remote devices is at least one of a smart phone, mobile device, automobile, personal computer, tablet, or personal digital assistant.

8. The method of claim 1, further comprising transferring the synchronized data to the each remote device of the one or more remote devices in response to one or more applications in the virtual machine having a state more recent than a state of a corresponding one or more applications residing at the one or more remote devices.

9. The method of claim 8, wherein the transfer of the synchronized data is restricted or allowed based on accessibility permissions of the one or more remote devices.

10. A non-transitory computer-readable medium storing computer instructions for accessing cloud-based services over a distributed network by a remote device, that when executed by one or more processors, perform the steps of:
   establishing communication between one or more remote devices and a virtual machine on a computing node of the cloud-based services via the distributed network, the cloud-based services comprising multiple operating systems and one or more applications, and the one or more remote devices being associated with a user;
   accessing the virtual machine on the computing node in response to receiving an instruction from a first remote device of the one or more remote devices, the virtual machine being associated with each remote device of the one or more remote devices;
   identifying a first operating system of the multiple operating systems in which to execute the one or more applications in a runtime environment when directed by the instruction, the identifying based on a first remote device operating system associated with the first remote device;
   transmitting results, based on execution of the one or more applications by the virtual machine in the runtime environment of the identified operating system, to the each remote device of the one or more remote devices via the distributed network;
   updating the one or more remote devices with the results transmitted by the virtual machine, the updating performed to synchronize data across the one or more remote devices such that the user can access the synchronized data at the each remote device of the one or more remote devices; and
   creating a virtual phone on the virtual machine by replicating one device of the one or more remote devices, the virtual phone receiving an incoming telephone call on the virtual machine, the virtual phone being accessible by at least one of the other one or more remote devices; and
   answering the incoming telephone call at a second remote device of the one or more remote devices when the user or the one or more remote devices is logged into the replicated version residing on the virtual machine.

11. The non-transitory computer-readable medium of claim 10, wherein the one or more processors further perform the steps of displaying a mirror image of the transmitted results executed by at least one virtual instance on one or more remote devices.

12. The non-transitory computer-readable medium of claim 10, wherein the one or more processors further perform the steps of: replicating one or more remote devices on the virtual machine to generate a replicated version, the replicating providing a cloned data of data stored on the one or more remote devices; and storing the cloned data in a database accessible by the virtual machine.

13. The non-transitory computer-readable medium of claim 10, wherein the virtual phone is created from a pool of applications and data libraries stored in a database and accessible over the distributed network.

14. The non-transitory computer-readable medium of claim 10, wherein the one or more remote devices have a web browser to access the cloud-based services.

15. A network device for accessing cloud-based phone services over a distributed network by a remote device, comprising:
   a non-transitory memory storage comprising instructions; and
   one or more processors in communication with the memory, wherein the one or more processors execute the instructions to:
   establish communication between one or more remote devices and a virtual machine on a computing node of the cloud-based services via the distributed network, the cloud-based services comprising multiple operating systems and one or more applications, and the one or more remote devices being associated with a user;
   access the virtual machine on the computing node in response to receiving an instruction from a first remote device of the one or more remote devices, the virtual machine being associated with each remote device of the one or more remote devices;
   identify a first operating system of the multiple operating systems in which to execute the one or more applications in a runtime environment when directed by the instruction, the identifying based on a first remote device operating system associated with the first remote device;
   transmit results, based on execution of the one or more applications by the virtual machine, the updating performed in the runtime environment of the identified operating system, to the each remote device of the one or more remote devices via the distributed network;
   update the one or more remote devices with the results transmitted by the virtual machine to synchronize data across the one or more remote devices such that the user can access the synchronized data at the each remote device of the one or more remote devices; and
   creating a virtual phone on the virtual machine by replicating one device of the one or more remote devices, the virtual phone receiving an incoming telephone call on the virtual machine, the virtual phone being accessible by at least one of the other one or more remote devices; and
   answering the incoming telephone call at a second remote device of the one or more remote devices when the user or the one or more remote devices is logged into the replicated version residing on the virtual machine.

16. The network device of claim 15, wherein the one or more processors further execute the instructions to display a mirror image of the transmitted results executed by at least one virtual instance on the one or more remote devices.

17. The network device of claim 15, wherein the one or more processors further execute the instructions to: replicate the one or more remote devices on the virtual machine to generate the replicated version, the replicating providing a cloned data of the data stored on the one or more remote devices; and store the cloned data in a database accessible by the virtual machine.

18. The network device of claim 15, wherein the virtual phone is created from a pool of applications and data libraries stored in a database and accessible over the distributed network.

19. The method of claim 1, further comprising updating the first remote device of the one or more remote devices with data from the second remote device of the one or more devices.

20. The non-transitory computer-readable medium of claim 10, further comprising updating the first remote device of the one or more remote devices with data from the second remote device of the one or more devices.

21. The network device of claim 15, the one or more processors further execute the instructions to update the first remote device of the one or more remote devices with data from the second remote device of the one or more devices.

* * * * *